(12) United States Patent
Sørensen et al.

(10) Patent No.: US 11,096,402 B2
(45) Date of Patent: Aug. 24, 2021

(54) PRODUCTION OF A COFFEE EXTRACT PRESERVING FLAVOUR COMPONENTS

(71) Applicant: GEA Process Engineering A/S, Søborg (DK)

(72) Inventors: Jakob Kryger Sørensen, Copenhagen K (DK); Anders Holmen Pedersen, Copenhagen N (DK); Henrik Haraldsted, Farum (DK)

(73) Assignee: GEA Process Engineering A/S

( * ) Notice: Subject to any disclaimer, the term of this patent is extended or adjusted under 35 U.S.C. 154(b) by 0 days.

(21) Appl. No.: 15/324,639

(22) PCT Filed: Jul. 8, 2014

(86) PCT No.: PCT/DK2014/050211
§ 371 (c)(1),
(2) Date: Jan. 6, 2017

(87) PCT Pub. No.: WO2016/004948
PCT Pub. Date: Jan. 14, 2016

(65) Prior Publication Data
US 2017/0202237 A1    Jul. 20, 2017

(51) Int. Cl.
*A23F 5/26* (2006.01)
*A23F 5/08* (2006.01)

(52) U.S. Cl.
CPC . *A23F 5/26* (2013.01); *A23F 5/08* (2013.01)

(58) Field of Classification Search
None
See application file for complete search history.

(56) References Cited

U.S. PATENT DOCUMENTS

| | | | | |
|---|---|---|---|---|
| 2,062,109 A | * | 11/1936 | Rogers | A23F 5/04 241/12 |
| 2,223,260 A | * | 11/1940 | Meeker | A47J 42/16 241/101.3 |
| 2,576,299 A | * | 11/1951 | Knapp | A47J 31/42 241/245 |
| 2,955,768 A | * | 10/1960 | Engi | A47J 42/54 241/245 |
| 3,261,689 A | | 7/1966 | Ponzoni | |
| 3,801,716 A | * | 4/1974 | Mahlmann et al. | A23F 5/12 426/466 |
| 5,368,875 A | * | 11/1994 | Hibi | A23F 5/04 426/466 |
| 5,707,016 A | * | 1/1998 | Witsken | B02C 7/12 241/261.3 |
| 6,358,552 B1 | * | 3/2002 | Mandralis | A23F 5/32 426/306 |
| 7,441,717 B1 | * | 10/2008 | Majka | B02C 17/166 241/15 |
| 7,771,764 B2 | | 8/2010 | Honda et al. | |
| 7,794,772 B2 | | 9/2010 | Goto et al. | |
| 8,603,562 B2 | | 12/2013 | Gaonkar et al. | |
| 2005/0132893 A1 | * | 6/2005 | Arora | A23N 12/083 99/287 |
| 2006/0257547 A1 | * | 11/2006 | Honda | A23F 3/16 426/655 |
| 2006/0276337 A1 | * | 12/2006 | Sixl | A01N 47/36 504/104 |
| 2008/0260911 A1 | * | 10/2008 | Matsubara | A23F 5/243 426/78 |
| 2008/0311245 A1 | * | 12/2008 | Silver | A23F 5/265 426/52 |
| 2010/0282099 A1 | * | 11/2010 | Gil | B01F 3/1221 100/39 |
| 2012/0027900 A1 | * | 2/2012 | Huhn | A23F 5/02 426/385 |
| 2012/0076907 A1 | | 3/2012 | Ozaki et al. | |
| 2013/0177672 A1 | | 7/2013 | Robinson et al. | |
| 2017/0202236 A1 | * | 7/2017 | Pedersen | A23F 5/28 |

FOREIGN PATENT DOCUMENTS

| | | | |
|---|---|---|---|
| CN | 101123882 A | 2/2008 | |
| CN | 1744825 B | 5/2010 | |
| CN | 102365028 A | 2/2012 | |
| EP | 1 595 458 A1 | 11/2005 | |
| EP | 1745702 A1 | 1/2007 | |
| EP | 1844661 A1 | 10/2007 | |
| EP | 2378891 A1 | 10/2011 | |
| GB | 1200700 A | 7/1970 | |
| JP | 07163294 A * | 6/1995 | |
| WO | WO 9716073 A1 * | 5/1997 | A23F 5/08 |
| WO | WO 2010/073114 A1 | 7/2010 | |

OTHER PUBLICATIONS

Baggenstoss, J., Thomann, D., Perren, R. and Escher, F., Aroma Recovery from Roasted Coffee by Wet Grinding. 2010, Journal of Food Science, 75: C697-C702.*
English translation of JP-07163294-A , pp. 1-10. (Year: 1995).*
SPX Flow, "Colloid Mill Instruction Manual", Waukesha Cherry-Burrell, Form No. 95-03028, Sep. 2019, pp. 1-22.

* cited by examiner

*Primary Examiner* — Jeffrey P Mornhinweg
(74) *Attorney, Agent, or Firm* — Condo Roccia Koptiw LLP

(57) ABSTRACT

Disclosed herein is a process for preparing a coffee extract, comprising the steps of: providing a mixture of roasted coffee beans and water, milling the mixture of roast coffee beans and water in a pressurised chamber, and separating the milled mixture in a liquid coffee extract and spent coffee grounds. The coffee extract maintains many of the flavour components of the roasted beans.

20 Claims, No Drawings

PRODUCTION OF A COFFEE EXTRACT PRESERVING FLAVOUR COMPONENTS

CROSS REFERENCE TO RELATED APPLICATIONS

This application is the National Stage Entry under 35 U.S.C. § 371 of Patent Cooperation Treaty Application No. PCT/DK2014/050211, filed 8 Jul. 2014 the contents of which are hereby incorporated by reference herein.

INTRODUCTION

The present invention relates to a process for preparing a coffee extract preserving the original volatile constituents in the extract.

BACKGROUND ART

Production of instant coffee converts only the bean of the coffee plant into a particulate product easily soluble in hot water. The cherry has the fruit-pulp and hull removed leaving only the seed or bean, which is then dried to produce green coffee beans. While all green coffee beans are processed, the method that is used varies and can have a significant effect on the flavour of roasted and brewed coffee.

The green coffee beans are relatively stable and are transported from the coffee-producing countries to the consumers all over the world. At industrial sites for extraction the green coffee beans are processed to produce extract and/or instant soluble coffee. The green coffee beans are subjected to roasting. The roasting transforms the chemical and physical properties of the green coffee beans into roasted coffee beans. The roasting process is what produces the characteristic flavour of coffee. In the same process the coffee beans expand and change in colour, and density.

A commonly used roasting plant in the industry is rotating cylinders containing the green beans and hot combustion gases. When the bean temperature reaches typically 165-200° C. the roasting begins, accompanied by a popping sound similar to that produced by popcorn. These batch cylinders take about 8-15 min to complete the roasting depending on the initial moisture and desired final colour. Coffee roasting using a fluidized bed is also commonly used.

The roasted beans are then ground to enhance extraction with water. Grinding reduces the beans to 0.2-5.0 mm depending on the extraction process. Traditionally, roasted beans are ground by dry milling. The dry milling results in the escape of a characteristic odour, which illustrates the escape of aroma components from the roasted coffee beans. These escaped aroma components will be lost already in this first step of the production of the final instant coffee product.

The prior art has suggested some ways of maintaining coffee flavouring constituents. Thus, GB 1.200.700 discloses the use of additional water-soluble coffee gum for maintaining oil and coffee flavouring constituents. The soluble dry coffee gum is preferably blended with the roasted coffee prior to grinding of the latter. During the blending and particularly during the grinding of the blend, the dry soluble gum particles serve as absorbents for oil and coffee flavouring constituents.

EP1844661 discloses a method to produce a soluble coffee extract, said method comprising: (1) finely wet milling roasted coffee solids to form a coffee slurry containing coffee solids; (2) treating the coffee slurry with an effective amount of an enzyme in the form of a stabilised enzyme composition at a temperature and for a time sufficient to hydrolyse the coffee solids to form a soluble coffee extract material, wherein the stabilised enzyme composition comprises the enzyme and an effective amount of a coffee-derived material to stabilised the enzyme; and (3) separating the soluble coffee extract material into a retentate and a permeate, wherein the permeate comprises the soluble coffee extract.

Membrane based methods have been suggested in the prior art to remove off-flavours such as 5-hydroxymethyl furfural (5-HMF). 5-HMF is perceived to have a winey or hay-like taste. EP1745702 also relates to a membrane based method, wherein a coffee extract is produced by finely wet-milling coffee beans or ground coffee or pre-extracted coffee grounds with hydrolase enzymes, preferably carbohydrase or protease enzymes, e.g. glucanases and mannanases, or mixtures thereof, the mixtures preferably comprising mannanase, cellulase and protease enzymes, and wherein the enzymes are retained in the reaction zone, via the use of a membrane device, so that the finished extract is essentially devoid of enzyme, oil or particulates and the enzyme(s) can eventually be re-used. The process results in a reaction zone in which only a small amount of 5-hydroxymethyl furfural (5-HMF) is present, because 5-HMF penetrates the membrane and thus does not inhibit the enzyme activity.

The present invention devices a process for preserving coffee aromas in a coffee extract or for alternative use in the coffee processing. Especially, the volatile coffee aroma components are preserved. Maintenance of the aroma components in the coffee extract improves the quality of the final product. The quality improvement involves the sensoric (taste, smell, visual impression etc.) experience when the instant coffee particles are wetted with hot water due to the evaporation of the volatile aroma components.

SHORT DESCRIPTION OF THE INVENTION

The present invention relates to a process for preparing a coffee extract, comprising the steps of providing a mixture of roast coffee beans and water, milling the mixture of roast coffee beans and water in a pressurised chamber, and separating the milled mixture in to a liquid coffee extract and spent coffee grounds for example by percolation.

The submersion of the roasted beans in water during the milling results in a substantial amount of volatile aroma components being dissolved in the water and appearing in the extract instead of being liberated to the ambient air. In addition, the closed pressurised chamber ensures that the solubility of the volatile water soluble aroma components is increased and that the volatile components are maintained in the same compartment without escaping to the surroundings. Furthermore, oxidisation is avoided.

The use of a pressurised chamber for milling the mixture of roast coffee beans and water also reduces the tendency of foaming. Probably due to the gas from the $CO_2$ release and the protein content in the beans, which is around 10% by weight the wet grinding process may result in the build-up of foam during milling. The foam formation may result in process stop and subsequent laborious cleaning of the equipment. A higher-than-ambient pressure prevents $CO_2$ bubble release and thus reduces the foam formation. Alternative methods for reducing the foaming are foam control devices and excipients.

Furthermore, the combination of the milling and the first extraction in a single process step reduces the complexity of the over-all process.

Traditional household coffee brewing is performed at a water temperature around the boiling point, i.e. 100° C. In industrial facilities the extraction temperature is higher, e.g. 180° C., to obtain a higher yield. While the present invention may be performed at any temperature usually used for extracting coffee, it is preferred that the water is heated prior to the mixing with roast coffee beans to achieve a mixture of 80° C. or less. The use of relatively cold water prevents volatile aroma compounds from degrading. Many aroma components tend to degrade or react with oxygen, water, or compounds in the aqueous mixture. The reaction products produce a sensoric experience of an uncertain nature.

In some embodiments low-temperature extraction at 80° C. or less, optionally including intermediate steam explosion, in itself results in a surprisingly high yield of up to 50%. Such method may find its use also in household coffee making as well as in semi- and professional coffee brewing (café equipment and automates). The method will result in a ready-to-drink extract made in a device which can handle the required particle size, pressure etc. One such consumer device will offer the user a higher yield and quality relative to common household coffee makers. This will result in less consumption of coffee beans as well as lead to energy savings as the water temperature is 80° C. or less. A derived benefit would be that the consumers reduce the risk of burns.

In other embodiments the water is heated prior to the mixing with roast coffee beans to achieve a mixture of 95° C. or less, such as 90° C. or less. In other embodiments a lower temperature of the water is used, such as a temperature at or below 60° C., suitably below 50° C. to obtain a decreased tendency for reaction of the aromatic components and a lower vapour pressure of the volatile components. In a certain embodiment the temperature of the mixture of roasted coffee beans and water is at or below substantial protein denaturing. Typically, substantial protein denaturing occurs at or below 40-90° C. To avoid heating of the water prior to mixing, the temperature may be that of tap water. Alternatively, the water is heated slightly to around room temperature.

The use of low temperature results in a reduced production of 5-HMF and other decomposition products with an unpleasant taste. While the extraction preferably is performed at temperatures below 80° C., generally the extraction step is performed at a temperature in the range of 10-80° C. Preferably, the extraction is performed at 15° C. to 45° C., most preferred at room temperature, to prevent that the temperature of the water contributes to the production of decomposition products.

The first extraction generally entails that the milled mixture is maintained in the pressurised chamber for 5 min to 2 hours or more before separation to obtain a sufficient extraction of soluble components. The specific time used for the extraction depends on a number of factors, including the temperature, particle size of the roasted beans, water to bean ratio, water flow rate etc.

The mixing of the roasted beans and water, and the milling of this mixture may occur in separate compartments and at different pressures. In an aspect of the invention the mixing is performed at ambient pressure, whereas the milling is performed in a pressurised compartment. However, in a preferred embodiment both the mixing of roast coffee and water occurs is a pressurised chamber. The pressure of the mixing chamber and the milling chamber may be different but is suitably at substantially the same level. In an aspect of the invention the pressure during the milling step is 0.5 barg or more, preferably 1 barg or more.

The mixing of the roasted coffee beans and water may occur as an in-line process step immediately prior to the milling of the mixture. The in-line mixing ensures effective handling and short process time. Alternatively this can be done in a batch process.

During the mixing and the milling step of the present invention $CO_2$ is liberated. The liberated $CO_2$ may be vented out of the mixing or the milling chamber. In a certain aspect it is preferred, however, that a major amount of the $CO_2$ liberated from the roast coffee beans during the mixing and/or the milling process steps is maintained together with the mixture of roast coffee and water extract. In a preferred aspect essentially the entire amount of $CO_2$ is maintained in the milling chamber during the milling process. After the milling procedure, the pressure of the milled mixture is reduced. Suitably, the pressure is reduced to the ambient pressure. By the pressure reduction, $CO_2$ and other volatile components may be collected or discharged to surroundings. In a certain embodiment the gas liberated by the reduction of the pressure is passed through a freezing trap to collect volatile aroma components. The reduction of the pressure may be performed prior to, simultaneously with or subsequent to a reduction in temperature, if necessary. The temperature may, if necessary, be reduced to between 0 and 30° C. prior to the separation step.

The roasted coffee beans may be milled to any size suitable for extraction. Usually, the roast coffee beans are milled to a mean particle size of 1000 μm or less.

In some aspects, the coffee extract of the invention is used unmodified in subsequent processes. In other aspects the liquid coffee extract is further separated in an aqueous coffee extract and coffee oil.

The liquid coffee extract produced by the present invention may be used as such or further processed. If the liquid coffee extract is further processed it may be dried to an instant coffee product, optionally after being blended with other coffee extracts. The drying may occur by conventional spray drying or freeze drying or in combined processes including special aroma-recovery features and re-introducing features.

The spent coffee grounds may be discarded or used for secondary extraction.

DETAILED DESCRIPTION

In general, any equipment capable of wet-milling to the required particle size range is acceptable and this may include a combination of rotor-stator devices, media mills containing grinding media, cone mills or other shearing devices such as ultrasonic devices and cavitation devices. Further, for a given equipment type, the performance and resulting coffee particle size can be varied by operating parameters such as rotational speed, throughput rate of coffee, size and shape of media (e.g. in a micro mill) and screen size in a rotor/stator or similar shearing device. A rotor/stator mill, for example Admix Boston Shearmill™ or Ross Model ME-430XS-6 (Charles Ross & Sons, Hauppage N.Y., USA), can be used for the milling step, although other mills, for example colloid mills such as Charlotte SD-2 (Bradman-Lake, Charlotte N.C., USA) or Dispx DRS-2000-5 (IKAUSA), are also suitable.

The separation of the extract from the solid components may be performed by any suitable device, including a centrifugal separator, membrane filtration, or belt filtration. A preferred centrifugal separator is a two phase decanter centrifuge. Suitable decanter centrifuges may be obtained from GEA Westfalia, etc.

When green coffee beans are roasted, molecules with the typical pleasant aroma of coffee are generated, which are not present in fresh green coffee.

If a secondary extraction is performed on the spent ground grounds, various methods may be used. Thus, the spent coffee grounds may be added to produce an aqueous suspension. The suspension may be hydrolysed using a hydrolysing enzyme to produce a second extract and spent remains. The second extract may be added to the first extract of the invention, optionally after concentration and/or drying of the second extract to obtain a combined extract. The combined extract may be dried to obtain an instant coffee product.

The hydrolysing enzymes used are able to decompose one or more of the various chemical constituents of the spent coffee grounds, such as carbohydrates, e.g. cellulose, hemicellulose, xylan, and starch; lignin; proteins; lipids; nucleic acids; etc. The decomposition products are preferably soluble in water. According to a preferred aspect, the hydrolysing enzyme is selected among carbohydrate hydrolysing enzymes or carboxylic ester hydrolysing enzymes or any combination of such enzymes.

The conditions for the enzymatic hydrolysis reaction may vary depending on the type and activity of enzyme used, the temperature of the reaction media, the pH etc. In a preferred embodiment, the hydrolysis step c) is performed on an aqueous suspension of spent coffee grounds at a temperature in the range of 40-80° C., at pH 4-7, in a time range of 1-16 hours.

To assist the enzymatic reaction it may be suitable that an auxiliary agent is present during the hydrolysis step c). Examples of auxiliary agents include acidity controllers, surfactants, chelators, co-factors, etc. In a certain aspect of the invention the auxiliary agent is a surfactant. A surfactant improves the yield significantly, and it might even be derived from coffee.

A coffee-derived surfactant may be produced by chemical means, such as disclosed in U.S. Pat. No. 8,603,562, the technical content being incorporated herein by reference. In a preferred aspect, the coffee-derived surfactant is obtainable by
  i. digesting spent coffee grounds with a carbohydrate hydrolysing enzyme to obtain carbohydrate fragments, and
  ii. adding to the carbohydrate fragments a coffee oil and a carboxylic ester hydrolysing enzyme at conditions allowing for transesterification.

The carbohydrate hydrolysing enzyme may be chosen from a large group of commercially available enzymes. In an embodiment of the invention the carbohydrate hydrolysing enzyme is selected from the group comprising cellulase, xylanase, hemicellulose, or any combination of these enzymes.

Similarly, the carboxylic ester hydrolysing enzyme may be chosen from a large group of commercially available enzymes. In an embodiment of the invention the carboxylic ester hydrolysing enzyme is selected from esterase, lipase, or any combination thereof.

The coffee oil used for the preparation of the coffee-derived surfactant may be inherently present in the ground coffee beans or the coffee oil may be added. If added, the coffee oil is derived from green coffee bean, roast and ground coffee, or spent coffee grounds extracts.

While the coffee-derived surfactant may be produced separately, it is also possible in a certain embodiment of the invention that the coffee-derived surfactant is obtained in-situ during the hydrolysing step by the addition of a carboxylic ester hydrolysing enzyme and optionally coffee oil to the aqueous suspension. The carboxylic ester hydrolysing enzyme will perform a transesterification in which lipophilic groups from the coffee oil is added carbohydrate components.

After the first but before the second extraction the spent coffee grounds may be pre-treated prior to the enzymatic hydrolysis. The pre-treatment may be performed to make it easier for the enzymes to access their substrate. The pre-treatment may involve exposure of the interior of the plant cells and/or loosening of the lignin from the cellulose. In a preferred embodiment, the pre-treatment involves
  addition of water to the spent coffee grounds,
  steam exploding the spent coffee grounds, and
  separating in an intermediate extract and pretreated spent coffee grounds.

The intermediate extract from the steam explosion procedure may be used in the final product, purified, or may be discarded or used for another application if it contains too many off-flavours. Generally, however, the steam explosion procedure is controlled so that the intermediate extract, either as is, concentrated and/or dried, is added to the combined extract.

If only a "mild" temperature steam explosion is performed the amount of off-flavours are generally low and acceptable. Therefore, the intermediate extract can be added to the combined extract. Preferred conditions for the steam explosion involves that the steam explosion is performed in the temperature range of 50-170° C., at a pressure of 0.1 to 10 barg for 0.1 to 5 hours.

Alternative methods to steam explosion may involve freezing or homogenisation.

To loosen up the structure of the lignocellulose and to partially break down the structure of the hemicellulose it may be advantageously to use a certain temperature regimen for the pre-treatment. The temperature regimen may comprise in any order
  A low temperature treatment period in the temperature range of 25 to 150° C. for 1 min to 24 hours, and
  A high temperature treatment period in the temperature range of 100 to 200° C. for 1 min to 24 hours.

The steam explosion may be performed separately or may be integrated in the temperature regimen. In a preferred aspect of the invention, the steam explosion is performed during the high temperature treatment period.

In between the steam explosion and enzymatic treatment steps washing procedures are beneficial since they will increase the efficiency of the enzymes. Such procedures remove the enzyme inhibitors and enhance the process. The washing water may be added to the combined extract.

After the enzymatic hydrolysis, the second extract may be post-treated either by
  Heating to a temperature above 70° C. in a time sufficient to inactivate the enzyme, typically 120° C. for 10-30 min, and possibly remove coagulated enzymes, or
  Membrane filtering to remove the enzyme, which optionally is re-used in step (c).

In the subsequent enzymatic hydrolysis step the spent coffee grounds may be further divided into smaller particles to ease the access for the enzymes. In a preferred aspect the spent coffee grounds are finely divided into an average particle size in the range of 2-1000 µm, preferably to 10-500 µm prior to the enzyme treatment. The ground coffee bean may be milled in two or more stages. The second milling may be performed as a wet-milling of the spent coffee grounds prior to enzymatic hydrolysis. The second wet-milling may occur before or after the steam explosion depending on the circumstances. Wet-milling to a mean particle size of 10 to 250 μm is preferred. The cumulative particle size distribution of the wet-milled spent ground coffee comprises about 90% or more of the particles to be below 150 μm, preferably below 100 μm and in some cases below 50 μm.

The invention affords a high aroma and solids yield by the production of first, intermediate, and second extracts. In a preferred aspect, the yield of total solids in the instant coffee product, based on the amount of roasted and ground coffee beans, is 65%, 70%, or 75% by weight or more.

The combined extracts or one or more of the first, intermediate, and second extract may be concentrated for example by membrane filtration prior to subsequent spray drying or freeze drying. In an aspect of the invention the extract is membrane filtered for recycling aqueous permeate, which may be slightly acid, for reuse in the process. As the first extract contains volatile aroma components it is generally desired that the first extract is concentrated in an aroma preserving way, such as freeze concentration.

EXAMPLES

Example 1

Aroma-Retaining Wet-Grinding Process

In the test setup the following steps are performed in succession in slightly pressurised equipment of 5 bars to minimise the loss of volatile aroma compounds:

1) Mixing of water and beans,
2) Milling beans and water to a slurry, and
3) Pumping the slurry to fill an extraction column Step 1: Whole, roasted coffee beans are mixed with 25° C. water in a ratio of about 1:5 and are then fed directly into a wet grinding mill. The bean-water mixing is accomplished by an inline mixer immediately upstream of the wet grinding mill. The water amount may be varied, however, it should be taken into consideration that a low amount of water may result in a slurry which is difficult to pump, and that a high amount of water may result in a process, which is wasteful with regards to water and energy use.

Step 2: The wet grinding mill is a high shear mill, Admix Boston Shearmill™. In the wet grinding mill the beans are wet ground to a mean particle size of about 400 μm to provide a pumpable slurry.

Step 3: The pumpable slurry is subsequently pumped directly into an extraction column fitted with a suitable filter at the end. When the extraction column is full, a volume of water approximately equal to the volume of coffee ground slurry is pushed through the coffee grounds to extract any easily soluble solids, including coffee aroma components. The temperature of the water is around 25° C. The total extraction time is 12 min from starting the wet milling to the collection of aroma extract.

The combination of wet grinding, short extraction time (enabled by the small particle size), and low temperature, ensures that the maximum amount of coffee aroma components are retained in the aroma extract.

After the extraction of aroma compounds, the aroma extract is kept at 10° C. The spent ground beans can then be further extracted by other techniques, such as suggested in example 2 below. If needed, the aroma extract can be concentrated or dried in a gentle manner—for example using a freeze concentration technique or spray drying with an optionally aroma recovery, or freeze drying.

Example 2

Secondary Extraction.

The filter cake from the previous extraction was transferred to a vessel capable of sustaining high pressure and high temperature. The bottom valve of the vessel was fitted with metal tubing connected to a cyclone so that high pressure within the vessel can be released into the cyclone. Water (2000 mL) was added to the coffee grounds, the container was sealed, and the temperature was raised to 140° C. while the slurry was stirred. After 90 minutes at 140° C., the bottom valve was opened to allow the slurry to escape into the cyclone. The sudden drop in pressure causes a steam explosion that disrupts the fibers in the coffee grounds, making them more suitable for the next extraction step. The slurry was again filtered on a Büchner funnel and the filter cake was washed with water (500 mL). The combined extract is called extract 2.

The spend grounds from the previous extraction were homogenized on a Turrex T18 High Shear Homogenizer at full speed for 60 minutes. A mixture of enzymes was then added, 10.75 g GEA enzyme no. 51 (small samples can be retrieved upon request) and the slurry was heated to 60° C. while stirring for 16 hours. The slurry was then filtered on a Büchner funnel, the filter cake was washed with water (500 mL). The combined extract is called extract 3.

The extract of example 1, extract 2 and extract 3 were combined and subjected to spray drying. Alternatively, only extract 2 and 3 are combined and subjected to spray drying whereas the extract from example 1 is treated mildly by freeze-drying, membrane filtration or similar techniques, to preserve the volatile components. The dried products from extract 2 and 3, and the dried product from the extract of example 1 may be combined to an instant coffee product.

Example 3

The following example shows how a relatively high extraction yield can be obtained at relatively low temperature Roasted coffee beans (400 g, TS 95.05%, 380 g dry weight) were ground on a commercially available coffee grinder to a mean particle size of 400 μm. The roasted and grounded coffee beans were then transferred to a container together with 1000 mL water (25° C.) and the container was sealed and evacuated to remove any excess $CO_2$ trapped inside the roast and ground coffee. The slurry was thoroughly mixed and the vacuum was then removed.

After two min, the slurry was transferred to an extraction column, fitted with a 300 μm filter in one end. Soluble solids were extracted from the beans by pumping water (25° C.) through the column, until Brix of the effluent was 0.5. The collected volume was 2777 mL and the amount of dissolved solids was 3.56%, corresponding to a yield of 98.86 g or 26%.

The coffee grounds were then removed from the column and transferred together with water (2000 mL) to a vessel capable of sustaining high pressure and high temperature. The bottom valve of the vessel was fitted with metal tubing connected to a cyclone so that high pressure within the vessel can be released into the cyclone. The container was sealed, and the temperature was raised to 140° C. while the slurry was stirred. After 60 min at 140° C., the bottom valve was opened to allow the slurry to escape into the cyclone. The sudden drop in pressure causes a steam explosion that disrupts the cells in the coffee grounds and seems to improve the yield.

The coffee grounds were then extracted with water (65° C.) until Brix of the effluent was 0.1. The collected volume of extract at this step was 5283 mL and the amount of dissolved solids was 1.33%, corresponding to 70.3 g. The total extraction yield of the two combined extraction steps is 169 g or 44%. This is quite surprising and in the range of 50% more than normally expected.

The invention claimed is:

1. A process for preparing a coffee extract, comprising:
providing a mixture of whole roasted coffee beans and water,
submerging the whole roasted coffee beans in the water,
milling the mixture of the submerged whole roasted coffee beans and the water in a closed pressurized chamber of a rotor/stator mill, wherein the pressure during the milling is greater than 0.5 barg, and
separating the milled mixture into a liquid coffee extract and spent coffee grounds, wherein after milling, the milled mixture is maintained in the closed pressurized chamber for 5 min to 2 hours before separation.

2. The process according to claim 1, wherein the water is heated prior to the mixing with the whole roasted coffee beans to achieve a mixture of 80° C. or less.

3. The process according to claim 1, wherein the water is heated prior to the mixing with the whole roasted coffee beans to achieve a mixture of 90° C. or less.

4. The process according to claim 1, wherein the water is heated prior to the mixing with the whole roasted coffee beans to achieve a mixture of 95° C. or less.

5. The process according to claim 1, wherein the milled mixture is maintained in the closed pressurized chamber for 10 min to 1 hour before separation.

6. The process according to claim 1, further comprising mixing the roasted coffee beans and the water in the closed pressurized chamber.

7. The process according to claim 6, wherein $CO_2$ is liberated during one or more of the mixing of the submerged whole roasted coffee beans and water or the milling of the mixture, and wherein a majority of the liberated $CO_2$ is maintained together with the milled mixture.

8. The process according to claim 1, wherein the pressure of the milled mixture prior to the separation is reduced.

9. The process according to claim 1, wherein the temperature of the milled mixture is reduced to between 0 and 30° C. prior to the separation.

10. The process according to claim 1, wherein the submerged whole roasted coffee beans are milled to an average particle size of 1000 µm or less.

11. The process according to claim 1, wherein the liquid coffee extract is further separated into an aqueous coffee extract and coffee oil.

12. The process according to claim 1, wherein the separation takes place in one or more percolation columns.

13. The process according to claim 12, wherein the one or more percolation columns are operated continuously or semi-continuously.

14. The process according to claim 1, wherein the pressure during the milling is 1 barg or more.

15. A process for preparing a coffee extract, comprising:
mixing whole roasted coffee beans and water, wherein the whole roasted coffee beans are submerged in the water and the water temperature is below boiling,
milling the mixture of the submerged whole roasted coffee beans and the water in a closed pressurized chamber of a rotor/stator mill, wherein the pressure during the milling is between 0.5 barg and 10 barg, and
separating the milled mixture into a liquid coffee extract and spent coffee grounds,
wherein the process is performed batch-wise.

16. The process of claim 15, wherein the milling of the mixture is performed at a temperature between 10° C. and 80° C.

17. The process of claim 15, wherein the milling of the mixture is performed at a temperature between 15° C. and 45° C.

18. The process of claim 15, wherein the milling of the mixture is performed at room temperature.

19. The process of claim 15, wherein after milling, the milled mixture is maintained in the closed pressurized chamber for 5 min to 2 hours before separation.

20. The process of claim 15, wherein $CO_2$ is liberated from the milling of the mixture, and wherein a majority of the liberated $CO_2$ is maintained in the closed pressurized chamber, and wherein the liquid coffee extract is further separated into an aqueous coffee extract and coffee oil.

* * * * *